United States Patent
Mallary et al.

[11] Patent Number: 5,959,814
[45] Date of Patent: Sep. 28, 1999

[54] MAGNETIC DISK HAVING SEPARATE PARK AND TAKE-OFF ZONES

[75] Inventors: Michael Mallary, Berlin, Mass.; Sreekanth Venkatesan, Broomfield, Colo.

[73] Assignee: Quantum Corporation, Milpitas, Calif.

[21] Appl. No.: 08/931,150

[22] Filed: Sep. 16, 1997

[51] Int. Cl.$^6$ .................................................. G11B 5/82
[52] U.S. Cl. ............................................................. 360/135
[58] Field of Search .................................. 360/133, 135, 360/97.01–97.04; 369/291

[56] References Cited

U.S. PATENT DOCUMENTS

| | | | |
|---|---|---|---|
| 4,337,288 | 6/1982 | Takenaka et al. | 428/172 |
| 4,835,909 | 6/1989 | Richter et al. | 51/281 |
| 4,939,614 | 7/1990 | Shirakura et al. | 360/135 |
| 4,996,622 | 2/1991 | Takatsuki et al. | 360/135 |
| 5,274,509 | 12/1993 | Buch | 360/48 |
| 5,326,607 | 7/1994 | Muramatsu et al. | 428/65 |
| 5,422,763 | 6/1995 | Harris | 360/51 |
| 5,482,497 | 1/1996 | Gonnella et al. | 451/57 |
| 5,504,646 | 4/1996 | Tanaka et al. | 360/135 |
| 5,534,321 | 7/1996 | Alpha et al. | 428/64.2 |
| 5,550,696 | 8/1996 | Nguyen | 360/135 |
| 5,569,518 | 10/1996 | Hayashi | 428/141 |
| 5,593,341 | 1/1997 | Gonnella et al. | 451/57 |
| 5,650,900 | 7/1997 | Wei et al. | 360/135 |
| 5,798,164 | 8/1998 | Weiss et al. | 428/141 |

*Primary Examiner*—Allen T. Cao
*Attorney, Agent, or Firm*—Arnold, White & Durkee

[57] ABSTRACT

A disk configured to store magnetically readable data is comprised of three distinct annular regions: a parking zone, a take-off zone, and a data storage area. The parking zone is heavily textured or roughened on the order of about 1 microinch, but the take-off zone is only lightly textured or roughened. A transducer head is located over the parking zone when the rotational speed of the disk is relatively slow. Once the rotational speed increases above this minimal value, the transducing head is moved to the take-off zone until the speed of the disk approaches the desired operating speed.

7 Claims, 3 Drawing Sheets

FIG.—1

MAGNETIC DISK HAVING SEPARATE PARK AND TAKE-OFF ZONES

BACKGROUND OF THE INVENTION

1. Field of the Invention

This invention relates generally to magnetic media, and, more particularly, to a magnetic disk with separate park and take-off zones.

2. Description of the Related Art

Magnetic media, such as rigid or hard disks, are well known for storing data in magnetizable form. The disks are typically rotated by an electric motor on a central axis while data transducing heads positioned in close proximity to a recording surface of the disk record and/or read data. The transducing heads, during normal reading and recording operations, are maintained at a preselected distance from the recording surface, flying over the disk on a bearing of air as the disk rotates. The transducing heads commonly come into contact with the recording surface of the disk in a number of typical circumstances: such as when the disk is stationery; when the disk accelerates from a stopped orientation; and during deceleration just before the disk comes to a stop. Each type of contact is problematic, producing distinctive, undesirable performance issues.

A phenomenon commonly known as stiction has been observed in circumstances where the disk has been stationary for an extended period of time with the transducing heads resting thereon. Stiction is the result of a number of circumstances, including the highly polished and smooth nature of the recording surfaces of the disk and the transducing head, as well as a build-up of lubrication on the transducing head. These factors combine to cause the transducing head to adhere to the disk such that the torque of the motor used to rotate the disk cannot overcome the adhesion, and the disk will not rotate. Thus, the disk cannot begin to rotate, much less attain a rotational velocity sufficient to fly the transducing head over the disk. Moreover, even if the stiction is insufficient to prevent the disk from rotating, it will still substantially contribute to a mechanical wearing of the recording surface of the disk, eventually corrupting or causing a loss of data stored thereon.

The prior art has attempted to solve this problem by identifying an area of the disk that is exclusively used as a "parking" and "take-off" zone for the transducing head. Commonly, as is described in U.S. Pat. No. 5,062,021, this "take-off" and "parking" zone has been intentionally roughened to reduce stiction. A roughness on the order of 1 microinch has been observed to produce a desirable reduction in instances of stiction. A roughening of the disk surface, however, necessitates an increased flying height to reduce instances of contact between the disk and the transducing heads. Unfortunately, increased flying height has a dramatic negative impact on the density at which data can be stored on the disk. Storage density decreases exponentially with increased flying height. This flying height problem is particularly exacerbated as state-of-the-art disk drives approach flying heights on the same order as the desired roughness of the take-off and parking zones. That is, as flying heights approach 1 microinch, increased contacts and with the media attendant damage will only become more problematic.

Additionally, the "parking" and "take-off" zone of a magnetic disk can also be damaged by what is commonly referred to as "head slap." When the disk is stopped with the transducing heads located in the "parking" zone and in contact with the surface of the disk, it sometimes occurs that the disk drive is suddenly and violently accelerated, such as by dropping, bumping, kicking, etc. This acceleration can cause the transducing head to momentarily lift-off of the disk and then be slammed onto the surface of the disk, producing a dent with raised edges. In extreme cases, the raised edges approach 5 microinches, towering above a desirable 1 microinch roughening. Thus, when the disk is being accelerated to operating speeds (or decelerating from operating speeds) with the transducing head located in the "parking" and "take-off" zone, numerous violent contacts with the transducing head occur. These violent contacts are obviously undesirable, contributing to premature wear and failure of the transducing heads.

Furthermore, a roughened "parking" and "take-off" zone produces air flow characteristics that will not fly the transducing head at the desired height until the speed of the disk attains a large percentage of its final speed. That is, when the disk surface is roughened, the transducing head will spend more time over the "parking" and "take-off" zone at a height below that of the desired flying height. Moreover, there is a direct relationship between the degree of roughness and the disk speed needed to achieve the desired flying height. Accordingly, a transducing head will take longer to attain a desired flying height over a disk having a roughness on the order of 1 microinch as compared to a disk having a roughness on the order of 0.5 microinch. It should be appreciated that the more time it takes for a transducing head to reach the proper flying height, the more contacts that are likely to occur with the disk, and, accordingly, the more damage that will be done to the head and the disk.

The present invention is directed to overcoming, or at least reducing the effects of, one or more of the problems set forth above.

SUMMARY OF THE INVENTION

In one aspect of the present invention, an apparatus is provided for storing magnetically readable data. The apparatus includes a first, second, and third annular region wherein the first region has a roughness greater than the second and third regions and the second region has a roughness greater than the third region.

In another aspect of the instant invention, a method is provided for controlling the operation of a magnetically readable disk drive. The method includes: positioning a transducing head over a first annular region when the rotational speed of the disk drive is below a first preselected level; over a second annular region when the rotational speed of the disk drive is above the first preselected level and below a second preselected level; and over a third annular region when the rotational speed of the disk drive is above the second preselected level.

BRIEF DESCRIPTION OF THE DRAWINGS

Other objects and advantages of the invention will become apparent upon reading the following detailed description and upon reference to the drawings in which.

Figure 1:
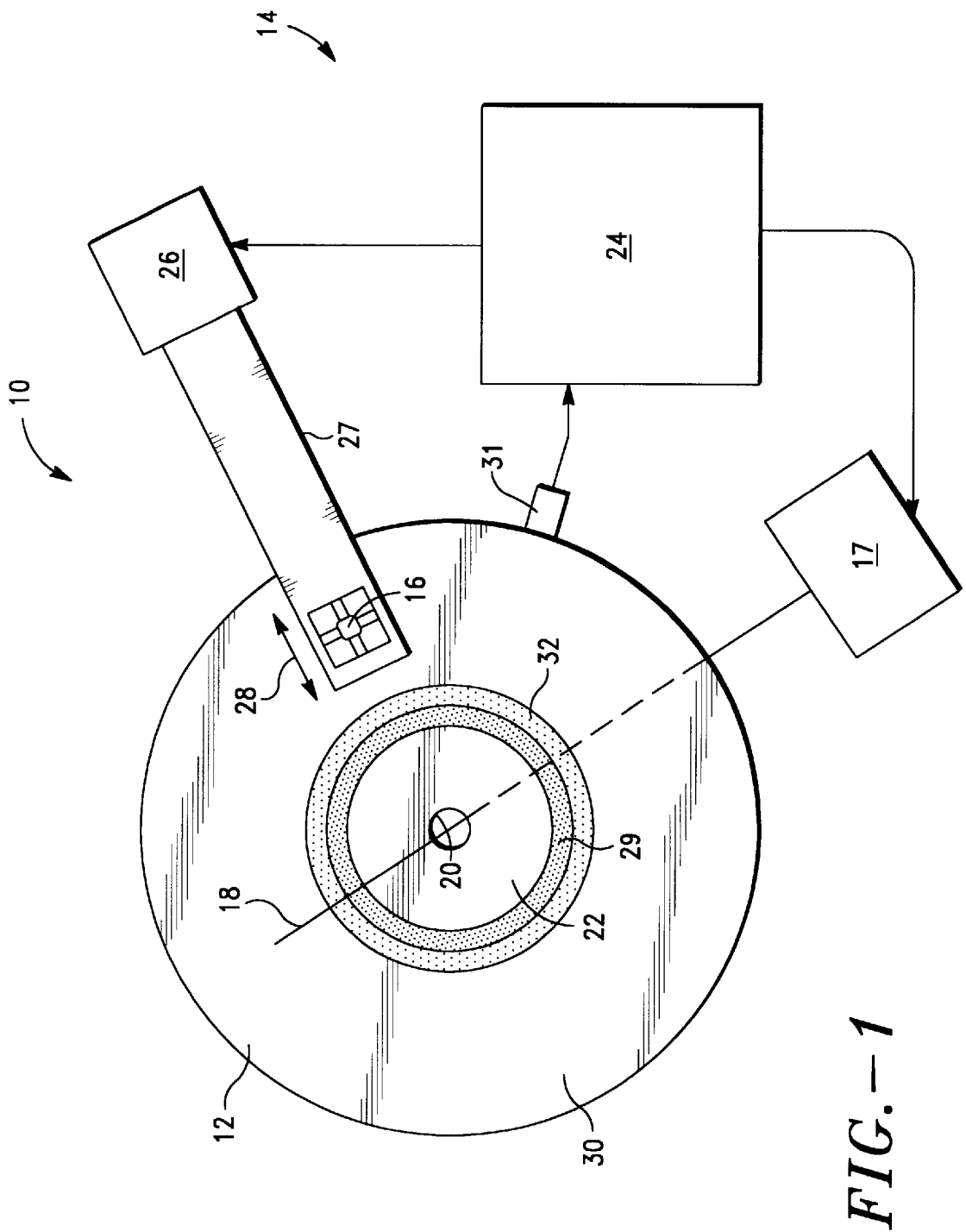
FIG. 1 is a stylized view of a hard disk drive, including a plan view of a magnetic disk and a block diagram of a system used to control a transducing head associated with the magnetic disk.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and in particular to FIG. 1, a stylized view of a hard disk drive 10 that includes a plan view of a magnetic disk 12 and a block diagram of a system 14 used to control a transducing head 16 associated with the magnetic disk 12 is shown. The magnetic disk 12 is rotated by a conventional electric motor 17 attached to the disk 12 in a region adjacent a central opening 20 in the disk 12. The motor 17 is coupled to the disk 12 via a conventional clamping mechanism (not shown) that engages the disk 12 in a central region 22.

A controller 24 manages the operation of the motor 17 and the transducing head 16 during start-up, shut-down, and normal operation. The controller 24 can take on any of a variety of forms, including a microprocessor (not shown) operating under software control, or a hard-wired circuit (not shown) constructed from discrete components, custom semiconductor devices, off-the-shelf semiconductor devices, or a combination thereof. The operation of the controller 24, as it relates to the instant invention, is described and discussed in conjunction with the flow chart representation of FIG. 2 below.

Positioning of the transducing head 16 is effected by a servo mechanism 26 that can take the form of any of a variety of conventional devices, including but not limited to linear actuators, rotary actuators, or the like connected through a suspension 27. In the illustrated embodiment, the servo mechanism 26 linearly translates the transducing head 16 across the surface of the disk 12 in the directions indicated by an arrow 28. Preferably, when the transducing head 16 is positioned over a data recording portion 30 of the disk 12, the transducing head 16 is flying at a preselected height above the surface of the disk 12 and under normal conditions should not contact the data recording portion 30 of the disk 12.

The disk 12 includes a roughened parking zone 29 extending about the central region 22 at an inner radius of the disk 12. Generally, the controller 24, during start-up and shut-down, operates to position the transducing head 16 over the parking zone 29 when the speed of the disk 12 attains a relatively slow velocity. The speed of the disk 12 is monitored by the control system 24 through a conventional sensor 31. The sensor 31 can take on a variety of forms, including but not limited to optical, mechanical, hall effect, and the like. Preferably, the parking zone 29 is roughened or textured to produce bumps on the order of about 1 microinch. This roughened area helps to minimize the occurrence of stiction problems.

A take-off zone 32 is adjacent the parking zone 29 and extends about the periphery of the parking zone 29, and preferably has a roughened texture on an order substantially less than that of the parking zone 29. Generally, the control system 24 operates to move the transducing head 16 to the take-off zone 32 during the time when the disk drive 10 is in either the start-up or shut-down mode and the disk 12 is spinning at a velocity above a minimum preselected value. Since the controller 24 operates to place the transducing head 16 over the take-off zone 32 at low rotational speeds, stiction remains a possibility in some applications. Thus, the take-off zone 32 in some applications is preferably lightly roughened or textured to minimize the possibility of stiction. Typically, the data recording area 30 of a disk has a surface finish on the order of about 0.1 microinch. Thus, the take-off zone 32 preferably has a surface finish on the order of between about 0.1 and 0.5 microinches. It should be appreciated that in applications where it is desirable for the transducing head 16 to take off rapidly, at a low velocity, the surface finish of the take-off zone 32 should be selected to have a less rough finish.

The parking zone 29 and take-off zone 32 can be roughened using any suitable process, including but not limited to mechanical and laser techniques described for example in U.S. Pat. No. 5,062,021, which is herein incorporated by reference in its entirety.

Figure 2:
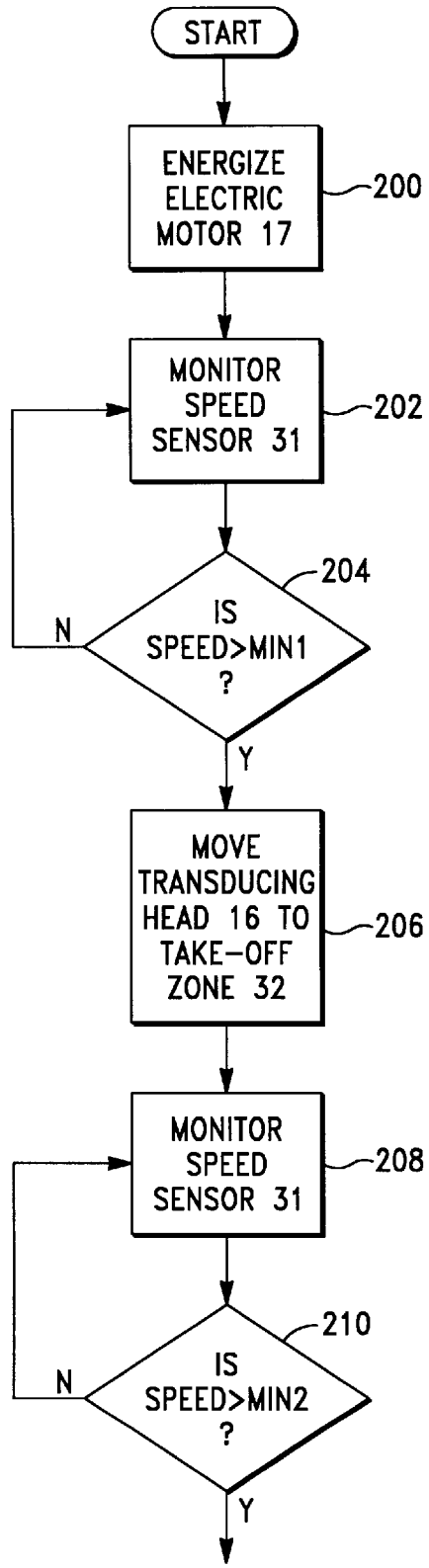
FIG. 2 is flow chart representation of a hard disk drive control strategy.

Referring now to FIG. 2, a flow chart of the procedure employed by the controller 24 as it relates to the instant invention is shown. At start-up, the controller 24 begins operation at a block 200 by energizing the electric motor 17 to begin rotating the disk 12. At a block 202, the controller 24 monitors the speed sensor 31 to determine the current rotational velocity of the disk 12. In a block 204, the controller 24 compares the speed determined from the speed sensor 31 to a first preselected minimum value (min1) to determine if the current speed of the disk 12 exceeds this minimum value. If the current speed of the disk 12 is less than min1, control is returned to the block 202 where the speed sensor 31 is again sampled to compute the new current speed of the disk 12. The process described in the blocks 202, 204 is repeated until such time as the current speed of the disk 12 is determined to be in excess of min1, at which time control transfers to block 206 where the controller 24 energizes the servo 26 to move the transducing head 16 from the parking zone 29 to the take-off zone 32. Thus, contacts between the heavily roughened surface in the parking zone 29 and the transducing head 16 occur only for a relatively short period of time until the speed of the disk 12 attains the relatively low value of min1.

Control is next transferred to a block 208 where the speed sensor 31 is again monitored to determine the current rotational velocity of the disk 12. At a block 210, the determined speed of the disk 12 is compared against a second preselected value (min2), which is a substantial percentage of the final velocity of the disk 12. If the controller 24 determines that the current speed of the disk 12 is below min2, control is again transferred to the block 208 where the speed sensor 31 is again sampled, and a new current speed of the disk 12 is determined. The process described in the blocks 208 and 210 continues until such time as the controller 24 determines that the current speed of the disk 12 exceeds the value min2, at which time control is transferred to a conventional control strategy (not shown), which manipulates the location of the transducing head 16 within the data recording area 30 of the disk 12 to effect conventional read and record commands.

It is envisioned that the control strategy described in FIG. 2 could readily be modified to operate without directly sensing the speed of the disk 12 by replacing the blocks 202, 204 and the blocks 208, 210 with a timer (not shown) that would effectively operate to estimate the time at which the speed of the disk 12 should approach the values min1, and min2. The timer delivers a first signal to indicate that a first preselected period of time has expired, causing the controller 24 to energize the servo 26 to move the transducing head 16 from the parking zone 29 to the take-off zone 32. Thereafter, the timer delivers a second signal to indicate that a second preselected period of time has expired. The controller 24 responds to the second signal by energizing the servo 26 to move the transducing head 16 from the take-off zone to the data recording area 30.

Figure 3A:
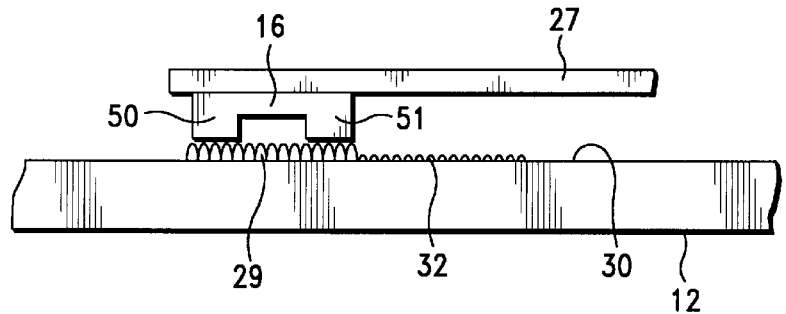
FIGS. 3A and 3B are a stylized, side-view of a first embodiment of the relationship between the hard disk and the transducing head.
Figure 3B:
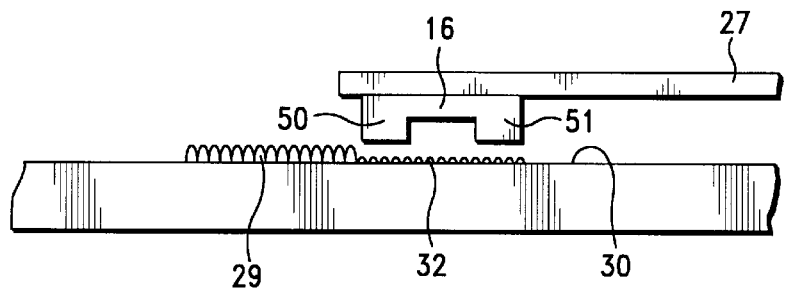

Turning now to FIGS. 3A, 3B, 4A, and 4B, two alternative embodiments regarding the configuration of the transducing head 16 and the width of the parking and take-off zones 29, 32 are shown and described. FIGS. 3A and 3B illustrate a first embodiment in which the transducing head 16 is composed of an inner rail 50 and an outer rail 51 that are relatively evenly disposed and designed to fly at about the same height above the disk 12. The parking zone 29 is shown positioned immediately below and spanning both the inner and outer sliders of the transducing head 16. Similarly, the take-off zone 32, as is apparent from FIG. 3B spans both the inner and outer rails 50, 51 when the transducing head 16 is located in a position above the take-off zone 32.

Figure 4A:
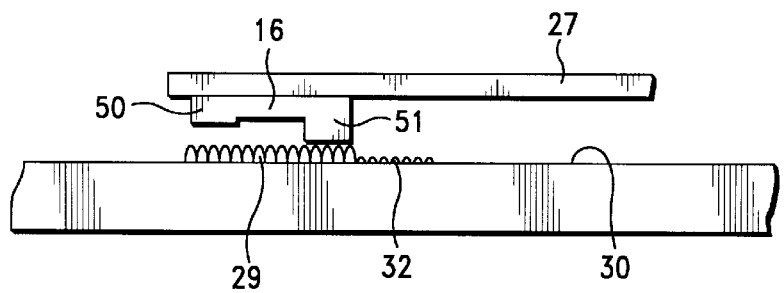
FIGS. 4A and 4B are a stylized, side-view of a second embodiment of the relationship between the hard disk and the transducing head.
Figure 4B:
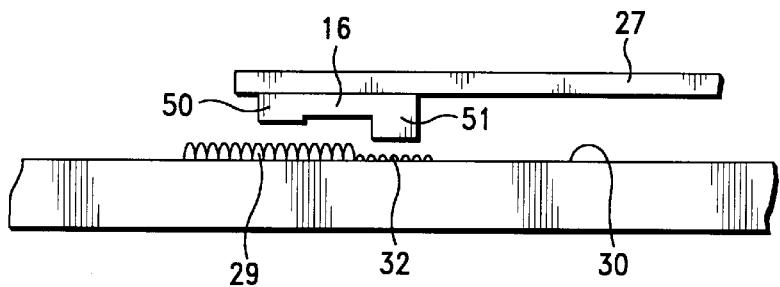

In the alternative embodiment shown in FIGS. 4A and 4B, the inner rail 50 is shown with a reduced vertical dimension as compared to that of the outer rail 51 to illustrate that the inner rail 50 flies at a substantially higher height than the outer rail 51. In actual reduction to practice the width of the rail 50 would be increased so that it flies higher, rather than decreasing its vertical dimension, as illustrated. Under actual flying conditions, the transducing head 16 is free to rotate or roll on an axis substantially parallel to the direction of rotation of the disk 12. This rolling action occurs in response to the greater lift provided by the inner rail 50, thereby providing the differential in flying heights between the rails 50, 51.

The parking zone 29 of the disk 12 is unaffected by the variation in flying height between the inner rail 50 and outer rail 51; however, the take-off zone 32 can be substantially reduced in width compared to the take-off zone 32 of the first embodiment of FIGS. 3A and 3B. The take-off zone 32 of FIGS. 4A and 4B need only be about ½ the width of the take-off zone 32 of the embodiment of FIGS. 3A and 3B, since the take-off zone 32 of FIGS. 4A and 4B need span only the outer rail 51. In FIG. 4B, the transducing head 16 is shown moved to a second position above the take-off zone 32 with the inner rail 50 remaining positioned over the parking zone 29. The increased flying height of the inner rail 50 permits the configuration shown in FIG. 4B, reducing the amount of disk space dedicated to the take-off zones 29, 32 and increasing the amount of disk space available for the data recording area 30.

We claim:

1. A disk drive capable of storing magnetically readable data, comprising:

a disk having a:

a first annular region adapted for storing magnetically readable data, said data storage area having a roughness of a first preselected order;

a second annular region adjacent said data area and having a roughness of a second preselected order, greater than said first preselected order; and a third annular region adjacent said first annular region and having a roughness of a third preselected order, greater than said second preselected order of roughness;

a motor coupled to said disk and adapted to rotate said disk;

a time adapted to deliver a first signal prior to the expiration of a first period of time, wherein said first period of time is preselected such that said disk rotates at a first speed by the expiration of said first period of time;

a second signal prior to the expiration of a second period of time, wherein said second period of time is preselected such that said disk rotates at a second speed by the expiration of said second period of time; and a third signal prior to the expiration of a third period of time, wherein said third period of time is preselected such that said disk rotates at a third speed by the expiration of said third period of time;

a transducing head adapted for reading and recording data magnetically in said first annular region; and means for positioning said transducer head over said first, second, and third annular regions in response to receiving the first, second and third signals, respectively.

2. A disk drive, as set forth in claim 1, wherein said transducing head has an inner and outer rail with said inner and outer rails adapted to fly at different preselected heights over said disk.

3. A disk drive, as set forth in claim 2, wherein said second annular region has a radial dimension less than the radial dimension of the third annular region.

4. A disk drive, as set forth in claim 3, wherein said outer rail has a radial dimension substantially similar to the radial dimension of the third annular region.

5. A disk drive, as set forth in claim 1, wherein said third annular region has a roughness on the order of about 1 microinch.

6. A disk drive, as set forth in claim 1, wherein said second annular region has a roughness in the range of about 0.1 to 0.5 microinches.

7. A method for controlling the operation of a magnetically readable disk drive, comprising:

positioning a transducing head over a first annular region of a disk having a first preselected roughness for a first preselected period of time, wherein said first preselected period of time indicates that said disk is rotating at a first desired speed;

positioning said transducing head over a second annular region of the disk having a second preselected roughness less than said first preselected roughness for a second preselected period of time, wherein said second preselected period of time indicates that said disk is rotating at a second desired speed; and positioning said transducing head over a third annular region of the disk having a third preselected roughness less than or equal to the second preselected roughness after the second preselected period of time, wherein said third preselected period of time indicates that said disk is rotating at a third desired speed.

* * * * *